J. F. WILLIAMS.
MACHINE FOR MOLDING EMERY WHEELS.
APPLICATION FILED NOV. 9, 1917.

1,254,183.

Patented Jan. 22, 1918.
3 SHEETS—SHEET 1.

Inventor.
J. F. Williams
by AJSDennison
Atty.

J. F. WILLIAMS.
MACHINE FOR MOLDING EMERY WHEELS.
APPLICATION FILED NOV. 9, 1917.

1,254,183.

Patented Jan. 22, 1918.
3 SHEETS—SHEET 3.

Inventor
J. F. Williams
by A. J. S. Dennison
atty.

UNITED STATES PATENT OFFICE.

JAMES FLEMING WILLIAMS, OF HAMILTON, ONTARIO, CANADA, ASSIGNOR TO CANADIAN HART WHEELS LIMITED, OF HAMILTON, ONTARIO, CANADA.

MACHINE FOR MOLDING EMERY-WHEELS.

1,254,183.   Specification of Letters Patent.   Patented Jan. 22, 1918.

Application filed November 9, 1917. Serial No. 201,024.

*To all whom it may concern:*

Be it known that I, JAMES FLEMING WILLIAMS, a citizen of the United States of America, and resident of the city of Hamilton, county of Wentworth, in the Province of Ontario, in the Dominion of Canada, have invented certain new and useful Improvements in Machines for Molding Emery-Wheels, as described in the following specification and illustrated in the accompanying drawings, that form part of the same.

The principal objects of the invention are, to effect a saving of time and labor in the manufacture of emery wheels and to produce a more uniform and serviceable article, and to devise a machine of simple and durable construction which will operate automatically in the rolling or forming of the wheel.

The principal feature of the invention consists in traversing a weighted roller over the surface of the mold and effecting a partial rotation of the mold following each movement of the roller and coincidently moving the bottom of the mold upwardly to raise the material within the mold.

A further important feature consists in the novel manner of reversing the mold so that both sides may be uniformly treated.

In the accompanying drawings, Figure 1 is a side elevational view of a machine constructed in accordance with this invention.

Figure 1:
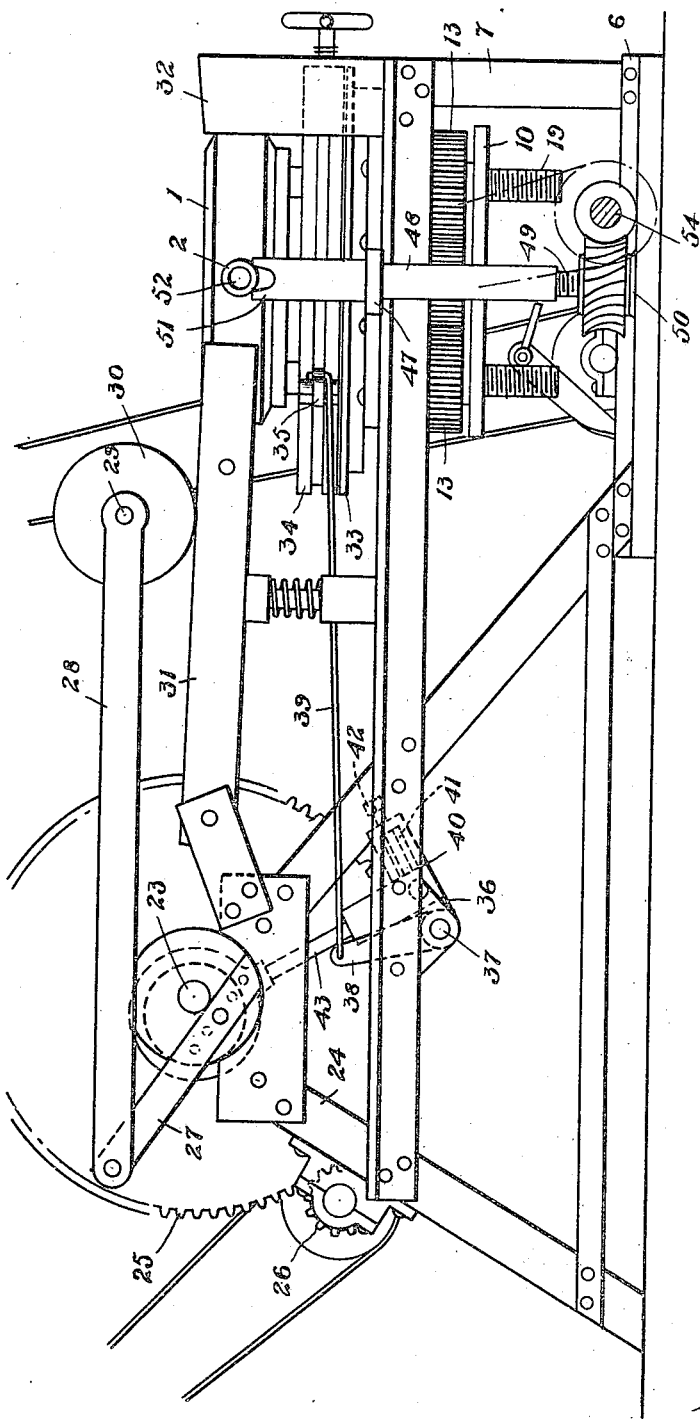
Figure 2:
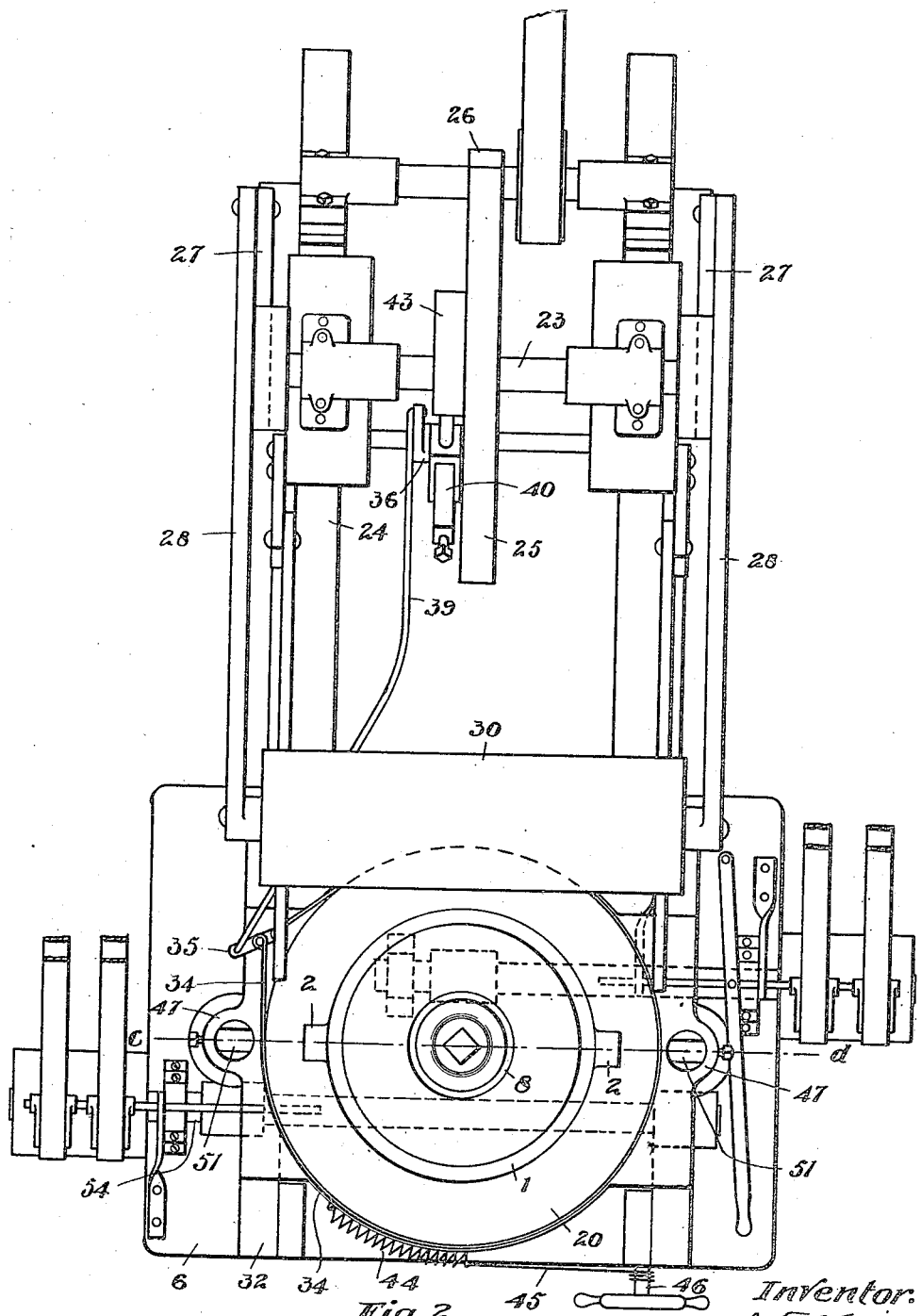
Fig. 2 is a plan view of the machine.
Figure 3:
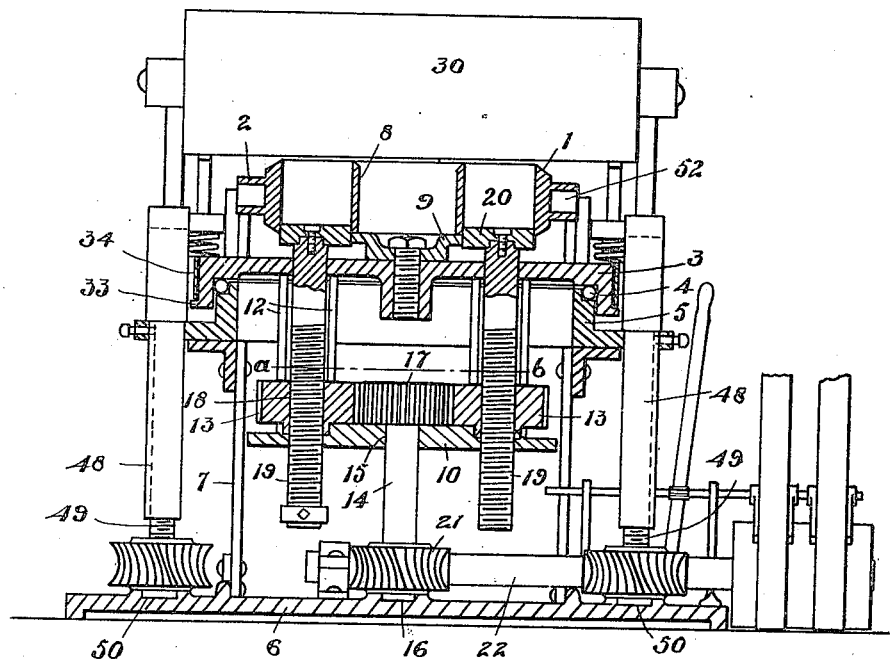
Fig. 3 is a vertical cross sectional view taken through the line c—d of Fig. 2.
Figure 4:
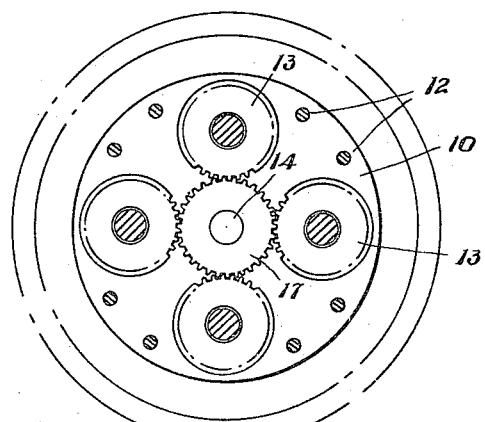
Fig. 4 is a transverse section on the line a—b of Fig. 3.

In the manufacture of emery wheels it has been found that hand made wheels in which the material is worked into the mold by hand are much more serviceable and safe than wheels manufactured by pressing and the main object of this invention is to retain all the advantages of a hand made wheel while reducing the labor and cost and to produce a wheel of even greater efficiency than those produced by hand.

Referring to the accompanying drawings, the mold 1 which is of ring shape and open at the top and bottom is formed with radially extending trunnions 2 upon which the mold is supported from a rotatable table 3.

The table 3 is carried upon a ball bearing support 4 arranged upon a ring shaped structure 5 supported from the base 6 by the legs 7. The circular mold center 8 is supported upon a centrally arranged block 9 secured on the table 3.

A circular plate 10 is suspended from the table 3 by a plurality of rods 12 and forms a gear table upon which are mounted a plurality of spur gears 13, the axes of which are spaced equidistant from the center of the plate 10.

A shaft 14 extends through a central journal 15 in the plate 10 and is journaled at the bottom in a bearing 16 in the base 6.

A spur gear 17 is secured to the upper end of the shaft 14 on the upper side of the plate 10 and meshes with the spur gears 13 so that on the rotation of the gear table around its center the gears 13 will be caused to rotate about their individual axes. Each of the gears 13 are formed with a threaded central orifice 18 in which the threaded jack screws 19 are supported.

The screws 19 extend upwardly through the table 3 and at their upper ends support the ring 20 which forms the bottom of the mold and is slidably arranged between the inner surface of the mold ring 1 and the outer surface of the mold center 8.

The shaft 14 has a worm wheel 21 secured on the lower end thereof which wheel meshes with a worm carried upon a transversely arranged shaft 22 supported in suitable bearings in the base. The worm acts as a brake upon the worm wheel and prevents its rotation through the rotative action of the gears 13 meshing with the central gear 17 secured to said shaft but the shaft 22 is adapted to be operated to rotate the worm gear 21 and shaft 14 for the purpose which will hereinafter appear.

A crank shaft 23 is journaled in bearings in the main frame 24 of the machine and upon this shaft is arranged a spur gear 25 which is driven by a spur pinion 26 operated by suitable power. Crank arms 27 extend from each end of the crank shaft and are connected to the connecting rods 28 which extend forwardly and are secured to the shaft 29 of the roller 30.

The roller 30 is of a desirable weight for rolling the material and it is carried upon the trackways 31 which are flexibly supported from the machine and extend each side of the mold 1 and lead the roller to and over the top of the mold.

32 are inclined blocks extending upwardly from the frame at the outer side of the mold to receive the roller as it passes over the said mold and upon which the roller rests momentarily before returning as the cranks pass over the dead center.

It will be seen that as the crank shaft rotates the weighted roller will pass over the top of the mold to a certain limit and will then return, thereby rolling the material placed in the mold and compressing it.

The rotating table 3 is provided with a lateral flange 33 at its bottom edge which flange supports an encircling brake band 34, the ends of which are connected to a lever 35.

A rocker arm 36 is pivotally supported in the frame below the crank shaft 23 upon the transverse shaft 37 and the upper end 38 of said rocker arm is connected by a rod 39 to the lever 35. The end 40 of the rocker arm 36 is provided with a longitudinal slot 41 and an adjusting screw 42.

43 is an eccentric arm mounted upon the crank shaft 23 and having its lower end pivotally secured to a block adjustably arranged in the slot 41 of the rocker arm 36.

It will thus be seen that as the crank shaft rotates the operation of the eccentric arm will cause the oscillation of the rocker arm upon its pivot and there will be a resultant back and forth movement to the rod 39 connected with the brake band lever. This oscillation may be regulated as desired by the operation of the adjusting screw 42 in order to effect a long or short throw with a consequent long or short movement of the brake band.

The operation of the brake band is such that on the forward throw of the rocker arm the lever 35 is pressed forward and loosens the band upon the table 3 and slides the band upon said table and upon the reverse motion the pull upon the rod 39 tightens the band upon the table and imparts a partial rotation thereto.

The sliding action of the band is controlled by means of a tension spring 44 which is connected at one end to the band and at the other end to a flexible cable 45 and said cable is wound upon a rotatable shaft 46. By rotating the shaft 46 the cable is wound or unwound so as to increase or decrease the tension of the spring and according to the tension exerted by the spring 44 the slip of the brake band upon the rotatable table is regulated.

The rotatable table and the mold is consequently automatically operated to be turned a short distance each time the roller moves back and forth over the surface of the mold, therefore the rolling action is imparted in a different direction in relation to the constituents of the matrix and a thorough kneading action of the granular substances of which the wheel is made is accomplished without crushing the particles, consequently the texture of the wheel will be thoroughly uniform throughout.

The rotative action of the table carries the jack screws 19 with them and also the gear table 10 and the gears 13 meshing with the spur gear 17 are caused to rotate thereby gradually elevating the screws and forcing the bottom ring 20 of the mold upwardly. The material placed in the mold is thus fed gradually upward as the device continues to be operated and the material is gradually consolidated.

In order that the wheel being constructed may be of uniform texture on both sides it is desirable to reverse the same during the progress of the rolling and in order to effect this change the machine is provided with extension arms 47 from the stationary ring 5 and secured in these arms are a pair of sleeves 48.

Jack screws 49 journaled in bearings 50 in the base extend upwardly through the sleeves 48 and carry the bifurcated members 51. The trunnions 2 of the mold are formed with circular orifices 52 and when it is desired to reverse the wheel, pins are placed in the said orifices in the trunnions 2 and the members 51 are elevated by means of the jack screws to engage said pins to lift the mold. The jack screws are operated by means of worm wheels 53 and a worm shaft 54 and the mold is raised sufficiently high so that it may be rotated on its trunnions to clear the bottom ring 5. When it has been turned over it is then lowered to its original position and the jack screws 19 may then be operated to push the partly formed wheel upwardly through the mold so as to bring its upper surface above the top of the ring by operating the center gear through the worm gear 21 and shaft 22. This same worm gearing may be operated to withdraw the bottom ring when desired or it may be operated when the wheel has been completed to raise the jack screws quickly and lift the finished wheel from the mold.

The operation of this device is extremely simple and the construction is of a strong and durable character and it is found in practice that wheels of exceptionally fine quality can be produced and that their texture is more uniform than is that of hand made wheels. The rolling action works the particles of abrasive material into place gradually and owing to the rotative action of the mold the direction of rolling is constantly changing in respect to the axis of the wheel being made.

The construction herein described is simple and effective and it will be understood that many changes may be made in the structural features without departing from the spirit of the invention which is to effect an intermittent partial rotation of the mold and a gradual feeding of the material within the mold upwardly in conjunction with the passing of the compressing roller member over the mold.

What I claim as my invention is:—

1. A machine for molding emery wheels, comprising, a mold, means for traversing a weighted roller over the mold, and means for intermittently rotating the mold and coincidently feeding the material upwardly within the mold.

2. A machine for molding emery wheels, comprising, a mold, means for traversing a weighted roller over the mold means for intermittently rotating the mold, and means operated through the rotation of the mold for feeding the material upwardly therein.

3. A machine for molding emery wheels, comprising, a mold having a movable bottom, means for traversing a weighted roller over the mold, means for intermittently rotating the mold and coincidently feeding the material upwardly within the mold, jack screws rotatably secured to said mold bottom, spur gears secured to said jack screws, a spur gear meshing with said jack screw gears, and means for holding said center gear stationary or rotating same.

4. A machine for molding emery wheels, comprising, a frame, a table rotatably supported on said frame, a mold supported on said table, a plurality of jack screws journaled in said table equidistant from the center thereof, a mold bottom supported on the upper ends of said jack screws above the table, a gear table suspended from the aforesaid table, spur gears threaded on said jack screws and rotatably secured in said gear table, a shaft journaled centrally in said gear table and supported at the bottom in a bearing in the frame, a spur gear secured to the upper end of said shaft and meshing with the jack screw gears, means for holding said shaft from rotation, means for rotating said shaft, means for rotating said mold and gear tables, and means for traversing a weighted roller over said mold.

5. A machine for molding emery wheels, comprising, a frame, a table rotatably supported on said frame, a mold supported on said table, a movable mold bottom adjustably supported from said table, means for adjusting said mold bottom, means for traversing a weighted roller over said mold, and means operatively connected with the roller operating means for imparting an intermittent partial rotation to the mold table and mold.

6. A machine for molding emery wheels, comprising, a frame, a table rotatably supported on said frame, a mold supported on said table, a movable mold bottom adjustably supported from said table, means for adjusting said mold bottom, means for transversing a weighted roller over said mold, means for supporting the roller clear of the mold, and means for imparting a partial rotation to said mold while the roller is held clear of the mold.

7. A machine for molding emery wheels, comprising, a frame, a table rotatably supported on said frame, a mold supported on said table, a movable mold bottom adjustably supported from said table, means for adjusting said mold bottom, reciprocating means for traversing a weighted roller over said mold, means operated by said reciprocating means for imparting an intermittent partial rotation to said mold.

8. A machine for molding emery wheels, comprising, a frame, a table rotatably supported on said frame, a mold supported on said table, a movable mold bottom adjustably supported from said table, means for adjusting said mold bottom, reciprocating means for traversing a weighted roller over said mold, an expanding band encircling said mold table and having its ends connected to an operating lever, a rocker arm operatively connected to said band lever, and means connected with said roller operating means and adapted to operate said rocker arm.

9. A machine for molding emery wheels, comprising, a frame, a table rotatably supported on said frame, a mold supported on said table, a movable mold bottom adjustably supported from said table, means for adjusting said mold bottom, a weighted roller adapted to pass over said mold, a crank shaft, connecting rods secured to said roller and operated by said crank shaft, an eccentric on said crank shaft, a rocker arm adjustably connected to said eccentric, an expanding band encircling said mold table, means connected with said band and said rocker arm and adapted to loosely rotate said band on said table and to contract and grip and rotate said table, and means for regulating the slip of said band.

10. A machine for molding emery wheels, comprising, a frame, a table rotatably supported on said frame, a ring mold supported on said table, means for traversing a weighted roller over said mold, means for rotating said table, means for feeding the material upwardly in the mold, and means for raising the mold from the table to allow of its rotation on its transverse axis.

11. A machine for molding emery wheels, comprising, a frame, a table rotatably supported on said frame, a ring mold supported on said table having radial trunnions, vertically movable members arranged each side of said table and adapted to be connected with said trunnions to raise the mold to allow its rotation on said trunnions, means for traversing a weighted roller over said mold, means for rotating said table, and means for feeding the material upwardly within the mold.

JAMES FLEMING WILLIAMS.

Witnesses:
 JOSEPH R. WILD,
 H. E. SHERK.

Copies of this patent may be obtained for five cents each, by addressing the "Commissioner of Patents, Washington, D. C."